US007435453B2

(12) United States Patent
Chen et al.

(10) Patent No.: US 7,435,453 B2
(45) Date of Patent: Oct. 14, 2008

(54) METHOD OF FINISHING VENEER SURFACE OF VENEERED WOOD PRODUCT BY APPLICATION AND CURING OF UV-CURABLE COATING LAYERS HAVING CATIONICALLY AND FREE-RADICALLY POLYMERIZABLE MOIETIES

(75) Inventors: Frank Bor-Her Chen, Greensboro, NC (US); Eugen Safta, Winston Salem, NC (US); George Ganghua Teng, Greensboro, NC (US); Shaobing Wu, Jamestown, NC (US); Jere Christopher Julian, Sr., Jamestown, NC (US)

(73) Assignee: Valspar Sourcing, Inc., Minneapolis, MN (US)

( * ) Notice: Subject to any disclaimer, the term of this patent is extended or adjusted under 35 U.S.C. 154(b) by 236 days.

(21) Appl. No.: 10/911,392

(22) Filed: Aug. 4, 2004

(65) Prior Publication Data

US 2006/0029825 A1 Feb. 9, 2006

(51) Int. Cl.
*B05D 7/08* (2006.01)
*B05D 3/06* (2006.01)
*C08F 2/48* (2006.01)

(52) U.S. Cl. ....................... 427/508; 427/393; 427/397; 427/408

(58) Field of Classification Search ................. 427/508, 427/553, 558, 595, 408; 428/414
See application file for complete search history.

(56) References Cited

U.S. PATENT DOCUMENTS 3,018,262 A 1/1962 Schroeder
3,117,099 A 1/1964 Proops et al.
3,669,716 A 6/1972 Keyl et al.
3,817,845 A * 6/1974 Feinberg ...................... 522/32
4,161,478 A 7/1979 Crivello et al.
4,173,476 A 11/1979 Smith et al.
4,276,329 A 6/1981 Vasishth et al.
4,913,972 A 4/1990 Grunewalder et al.
5,095,069 A 3/1992 Ambrose et al.
5,242,490 A 9/1993 Maner
5,624,471 A * 4/1997 Gaeta et al. ................... 51/295
5,635,248 A 6/1997 Hsu et al.
5,866,270 A 2/1999 West, Jr.
5,932,350 A 8/1999 Lauer et al.
6,174,967 B1 1/2001 Soucek et al.
6,203,915 B1 3/2001 Prissok et al.
6,231,931 B1 * 5/2001 Blazey et al. ............... 427/508
6,299,944 B1 10/2001 Trapini
6,342,273 B1 1/2002 Handels et al.
6,475,623 B1 11/2002 Magnusson et al.
6,635,142 B1 10/2003 Stula et al.
7,001,667 B2 * 2/2006 Dean et al. .................. 428/481

FOREIGN PATENT DOCUMENTS

JP 8-267412 10/1996
JP 9-254106 9/1997

OTHER PUBLICATIONS

C.L. Forbes, *Understanding and Minimizing Veneer Checking on Furniture Panels* (1997), a paper available at http://www.ces.ncsu.edu/nreos/wood/wpn/venchk.htm.
*Case Studies: Low-VOC/HAP Wood Furniture Coatings*, a paper available at http://www.epa.gov/ttn/atw/wood/low/downloads/wdrptpic.pdf (2000).
Shaobing Wu et al., *Synthesis of reactive diluents for cationic cycloaliphatic epoxide UV coatings*, Polymer 40, pp. 5675-5686 (1999).
Shaobing Wu et al., *Siloxane modified cycloaliphatic epoxide UV coatings*, Progress in Organic Coatings 36, pp. 89-101 (1999).

* cited by examiner

*Primary Examiner*—William P Fletcher, III
(74) *Attorney, Agent, or Firm*—IPLM Group, P.A.

(57) ABSTRACT

A veneer surface of a veneered wood product is finished by applying to the veneer surface and UV curing a multilayer finishing system wherein at least one of the subsurface layers comprises a UV cured cationically polymerizable moiety and the outermost layer of which comprises a free radically polymerizable moiety.

20 Claims, 1 Drawing Sheet

METHOD OF FINISHING VENEER SURFACE OF VENEERED WOOD PRODUCT BY APPLICATION AND CURING OF UV-CURABLE COATING LAYERS HAVING CATIONICALLY AND FREE-RADICALLY POLYMERIZABLE MOIETIES

TECHNICAL FIELD

This invention relates to veneered wood products such as furniture, kitchen cabinetry and engineered flooring.

BACKGROUND

Wood veneers are used extensively in the furniture and engineered flooring industries. Veneers can provide the appearance of a solid wood product while greatly reducing scarce hardwood consumption and costs. Unfortunately, finished veneer products are prone to checking, that is, the formation of cracks in the finish and their propagation along the wood grain. Checking may arise when the veneered product shrinks or expands due to external humidity or temperature changes that may in turn change the veneered product water content, especially when the veneer surface layer and underlying layer or core shrink or expand at different rates or to different extents. Checking may be especially common over lathe or knife marks (low areas or splits in the veneer caused by the veneer slicing equipment). Veneer manufacturers undertake a number of measures to discourage checking, such as the measures mentioned in C. L. Forbes, *Understanding and Minimizing Veneer Checking on Furniture Panels* (1997), a paper available at http://www.ces.ncsu.edu/nreos/wood/wpn/venchk.htm. Other references relating to veneer manufacture, veneer checking or its avoidance, or to wood coatings in general include U.S. Pat. No. 5,095,069 (Ambrose et al.), U.S. Pat. No. 5,242,490 (Maner), U.S. Pat. No. 5,635,248 (Hsu et al.), U.S. Pat. No. 5,866,270 (West, Jr.), U.S. Pat. No. 6,203,915 B1 (Prissok et al.), U.S. Pat. No. 6,231,931 B1 (Blazey et al.), U.S. Pat. No. 6,299,944 B1 (Trapani), U.S. Pat. No. 6,342,273 B1 (Handels et al.) and U.S. Pat. No. 6,635,142 B1 (Stula et al.); and Japanese Published Patent Application Nos. JP 8-267412 (Matsushita Electric Works, Ltd.) and JP 9-254106 (Nippon Shokubai Co. Ltd.).

SUMMARY OF THE INVENTION

Wood veneers have been coated in factories using multilayer UV curable finishing systems. Representative systems include those described in *Case Studies: Low-VOC/HAP Wood Furniture Coatings*, a paper available at http://www.epa.gov/ttn/atw/wood/low/downloads/wdrptpic.pdf. For example, multilayer systems employing UV curable, free radically polymerizable stains, fillers, sealers and topcoats have been employed in factory veneer finishing operations. Poor first coat or intercoat adhesion may arise when excessive UV doses are employed in such systems. Control of the UV dosage can be difficult under factory conditions, thus leading to substantial UV overexposure and eventual finish failure or veneer checking.

Coatings based on UV curable cationically polymerizable moieties appear to be less sensitive to UV overexposure and more adherent to wood fibers than corresponding coatings based on UV curable free radically polymerizable moieties. However, UV curable cationically polymerizable coatings may also take longer to reach full coating hardness, thus rendering them less well-suited as topcoats than faster curing UV curable free radically polymerizable coatings. In a multilayer finishing system, UV curable cationically polymerizable coatings and UV curable free radically polymerizable coatings can be beneficially combined, by applying to a veneered wood product a multilayer finishing system in which at least one of the subsurface coating layers comprises a UV curable cationically polymerizable moiety and the outermost layer comprises a free radically polymerizable moiety. This may provide substantial improvements in veneer check resistance, intercoat adhesion, or both veneer check resistance and intercoat adhesion.

In a preferred embodiment of the disclosed multilayer finishing system the coating layer or layers nearest the wood veneer layer (e.g., the clearcoat, stain or filler layers) comprise a UV curable cationically polymerizable or cationically/free radically polymerizable moiety. Such multilayer finishing systems can provide improved veneer check resistance.

In another preferred embodiment of the disclosed multilayer finishing system at least one of the subsurface coating layers comprises a UV curable cationically/free radically polymerizable moiety. Such multilayer finishing systems can exhibit improved intercoat adhesion to a subsequently applied coating layer containing a UV curable free radically polymerizable moiety, especially when a UV overdose has been accidentally or intentionally employed to apply the subsurface layer.

Accordingly, the disclosed multilayer finishing system provides, in one aspect, a method for finishing a veneer surface of a veneered wood product comprising applying to the veneer surface and UV curing a plurality of coating layers at least one subsurface layer of which comprises a UV curable cationically polymerizable moiety and the outermost layer of which comprises a free radically polymerizable moiety.

The disclosed multilayer finishing system provides, in another aspect, a method for finishing a veneer surface of a veneered wood product comprising applying to the veneer surface and UV curing a plurality of coating layers at least one subsurface layer of which comprises a UV curable cationically/free radically polymerizable moiety and the outermost layer of which comprises a free radically polymerizable moiety.

The disclosed multilayer finishing system provides, in another aspect, a method for finishing a surface of a veneered wood product comprising:

a) applying to the veneer surface and UV-curing a cationically polymerizable clearcoat or stain
b) applying to the thus-clearcoated or stained surface and UV-curing a cationically/free radically polymerizable filler, and
c) optionally applying to the thus-filled surface and UV curing a sealer, topcoat, or both topcoat and sealer.

The disclosed multilayer finishing system provides, in yet another aspect, a coated veneered article at least one visible surface of which comprises a wood veneer layer coated with a multilayer finishing system at least one subsurface layer of which comprises a UV cured cationically polymerized moiety and the outermost layer of which comprises a free radically polymerized moiety.

The disclosed multilayer finishing system provides, in yet a further aspect, a coated veneered article at least one visible surface of which comprises a wood veneer layer coated with a multilayer finishing system at least one subsurface layer of which comprises a UV cured cationically/free radically polymerized moiety and the outermost layer of which comprises a free radically polymerized moiety.

These and other aspects of the invention will be apparent from the detailed description below. In no event, however, should the above summaries be construed as limitations on the claimed subject matter, which subject matter is defined solely by the attached claims, as may be amended during prosecution.

Figure 1:
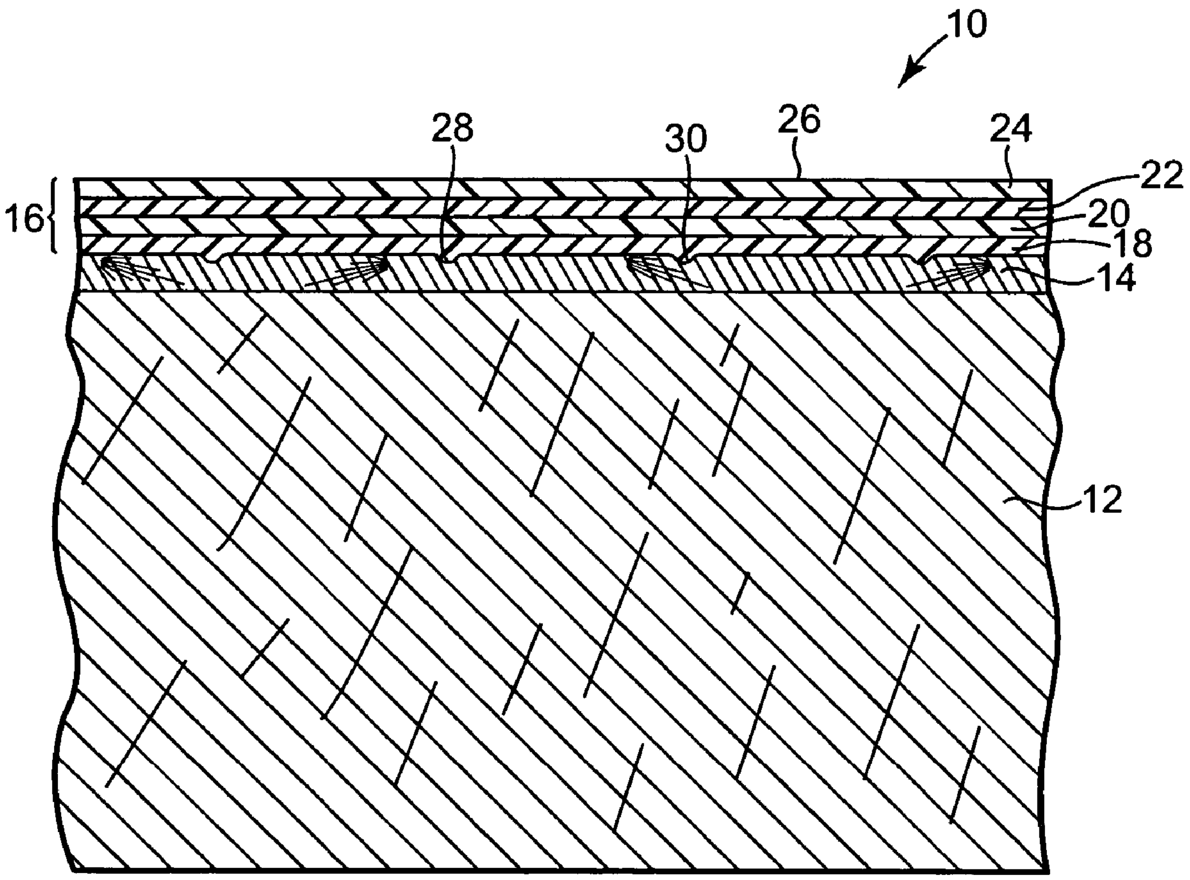
FIG. 1 shows a side sectional view of a veneered wood product coated with a multilayer finishing system.

The elements in the drawing are not to scale.

DETAILED DESCRIPTION

As used in connection with this invention, a "veneered wood product" has at least one surface comprising a relatively thin and typically higher cost wood layer (viz., a veneer layer) overlying a layer or layers of a relatively thick and typically lower cost material or materials comprising wood, wood fibers or other cellulosic substances (viz., a core).

As used in connection with this invention, a "multilayer finishing system" is a coating system comprising a plurality of flowable polymerizable compositions that can be successively applied to a veneer layer and hardened to form durable, adherent thin film layers. The multilayer finishing system includes one or more subsurface layers and an exposed outermost layer.

As used in connection with this invention, words of orientation such as "atop", "on", "uppermost" and the like as used to describe the location of various layers in the disclosed veneered wood product refer to the relative position of one or more layers with respect to a horizontally-disposed, upward facing veneer layer. We do not intend that the finished veneered wood product should have any particular orientation in space during or after its manufacture, and do not intend that a first layer said to be atop a second layer must be adjacent to the second layer.

As used in connection with this invention, an "oligomer" is a polymerizable moiety containing a plurality (e.g., 2 to about 8) of monomer units.

A multilayer finishing system is illustrated in FIG. 1. Veneered wood plank 10 includes medium density fiberboard core 12, hickory veneer 14 and multilayer finish 16. Finish 16 includes clearcoat or stain layer 18, filler layer 20, sealer layer 22 and topcoat layer 24. Layers 18, 20 and 22 are subsurface layers and layer 24 is the outermost layer. The exposed upper surface 26 of finish 16 desirably is smooth and unbroken despite the existence of knife marks 28 and 30 in veneer 14. Finish 16 desirably is resistant to veneer checking and delamination even if changes in temperature or humidity cause differential shrinkage or expansion of core 12 and veneer 14.

At least one subsurface layer of the multilayer finish comprises a UV curable cationically polymerizable moiety. If not containing a UV curable cationically polymerizable moiety, the remaining layers may contain any other suitable film forming moiety, e.g., a free radically polymerizable (e.g., UV curable) moiety such as a vinyl-functional oligomer, a thermally curable composition such as a urethane, a latex capable of coalescing to form a durable thin film, and other film forming moieties that will be familiar to those skilled in the art. The outermost layer comprises a free radically polymerizable moiety. Any or all of the layers may contain "dual cure" compositions containing individual or combined cationically polymerizable and free radically polymerizable moieties, capable of curing via cationic and free radical cure mechanisms upon exposure to UV energy. Preferably such dual cure layers are located in one or more subsurface layers but not in the outermost layer. Also, preferably the coating layer or layers nearest the wood veneer layer comprise a UV curable cationically polymerizable or dual cure moiety.

A variety of UV curable cationically polymerizable moieties may be employed in the disclosed multilayer finishes. Mixtures of cationically polymerizable moieties may also be employed. Representative UV curable cationically polymerizable moieties include epoxides and vinyl ethers with epoxides being preferred. Representative epoxides include monomeric, oligomeric or polymeric organic compounds having an oxirane ring polymerizable by ring opening, e.g., aliphatic, cycloaliphatic or aromatic materials having, on average, at least one polymerizable epoxy group per molecule and preferably two or more epoxy groups per molecule, and number average molecular weights from 58 to about 100,000 or more. Useful epoxides include materials having terminal epoxy groups (e.g., diglycidyl ethers of polyoxyalkylene glycols) and materials having skeletal oxirane units (e.g., polybutadiene polyepoxides). Representative epoxides include those containing cyclohexene oxide groups such as the epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6 -methylcyclohexylmethyl) adipate. For a more detailed list of useful cyclohexane oxide epoxides, reference is made to U.S. Pat. No. 3,117,099. Further representative epoxides include glycidyl ether monomers such as the glycidyl ethers of polyhydric phenols obtained by reacting a polyhydric phenol with an excess of chlorohydrin such as epichlorohydrin (e.g., the diglycidyl ether of 2,2-bis-(2,3-epoxypropoxyphenol)propane). For a more detailed list of useful glycidyl ether epoxides, reference is made to U.S. Pat. No. 3,018,262 and to Lee and Neville, *Handbook of Epoxy Resins*, McGraw-Hill, New York (1982). Other representative epoxides include octadecylene oxide, epichlorohydrin, styrene oxide, vinyl cyclohexene oxide, vinylcyclohexene dioxide, glycidol, diglycidyl ethers of Bisphenol A (e.g., those available under the trade designations EPON™ from Resolution Performance Products), epoxy vinyl ester resins (e.g., those available under the trade designations DERAKANE™ from Dow Chemical Co.), bis (2,3-epoxycyclopentyl) ethers, aliphatic epoxies modified with polypropylene glycol, dipentene dioxides, epoxidized polybutadienes, silicone resins containing epoxy functionality, epoxy silanes (e.g., beta-(3,4-epoxycyclohexyl)ethyltrimethoxy silane and gamma-glycidoxypropyltrimethoxy silane, flame retardant epoxy resins, 1,4-butanediol diglycidyl ethers, polyglycidyl ethers of phenolformaldehyde novolaks, and resorcinol diglycidyl ethers.

Multilayer finish system layers containing a UV curable cationically polymerizable moiety will typically also contain one or more UV photoinitiators capable of initiating cationic polymerization. The types and amounts of such photoinitiators will be familiar to those skilled in the art. Preferred photoinitiators include arylsulfonium salts such as those described in U.S. Pat. No. 4,161,478 (Crivello et al.) and U.S. Pat. No. 4,173,476 (Smith et al.), and ferrocenium salts such as IRGACURE™ 261, commercially available from Ciba Specialty Chemicals. Preferably, about 1 to about 9 wt. % cationic UV curing photoinitiator is employed.

A layer containing a UV curable cationically polymerizable moiety may as mentioned above also contain one or more free radically polymerizable moieties. Suitable free radically polymerizable moieties include acrylates, methacrylates and other unsaturated esters; acrylamides; methacrylamides; styrene-acrylics; vinyl halides; and other vinyl-functional polymerizable moieties such as n-vinyl-2-pyrrolidone that will be familiar to those skilled in the art. Layers containing blends of epoxides with acrylates or methacrylates are especially preferred. Layers containing moieties having both cationic and free radical UV curable functionality such as acrylated epoxides (e.g., glycidylmethacrylates or bisphenol A-based acrylated epoxides such as Sartomer CN104, CN120 and CN125) may also be employed. Curing of the free radically polymerizable moieties may be accomplished using a suitable initiator, e.g., a UV photoinitiator capable of initiating free radical polymerization. Thus a layer containing at least one UV curable cationically polymerizable moiety and at least one free radically polymerizable moiety will preferably contain at least two UV photoinitiators, namely one to cure the cationic UV curable moiety and one to cure the free radical UV curable moiety. The types and amounts of suitable free radical UV curing photoinitiators will be familiar to those skilled in the art. Exemplary free radical UV curing photoinitiators include 1-phenyl-2-hydroxy-2-methyl-1-propanone, oligo{2-hydroxy-2 methyl-1-[4-(methylvinyl)phenyl]propanone}, 2-hydroxy 2-methyl 1-phenyl propan-1 one, bis (2,6-dimethoxybenzoyl)-2,4,4-trimethylpentyl phosphine oxide, 2,4,6-trimethyl benzoyl-diphenyl phosphine oxide, 2-methyl-1-[4(methylthio)-2-morpholinopropan]-1-one, 1-hydroxycyclohexyl phenyl ketone, 4-(2-hydroxy) phenyl-2-hydroxy-2-(methylpropyl)ketone, 2,2-dimethoxy-2-phenyl acetophenone, benzophenone, benzoic acid, (n-5,2,4-cyclopentadien-1-yl) [1,2,3,4,5,6-n)-(1-methylethyl) benzene]-iron(+) hexafluorophosphate, 4-(dimethyl amino)-ethyl ether and mixtures thereof. Commercially available free radical curing UV photoinitiators include 2-hydroxy 2-methyl 1-phenyl propan-1 one (DAROCURE™ 1173, commercially available from Ciba Specialty Chemicals), 1-hydroxycyclohexylphenylketone (IRGACURE™ 184, available from Ciba Specialty Chemicals), a 50:50 weight basis mixture of 1-hydroxycyclohexylphenylketone and benzophenone (IRGACURE 500, available from Ciba Specialty Chemicals), bis(n,5,2,4-cyclopentadien-1-yl)-bis[2,6-difluoro-3-(1H-pyrol-1-yl)phenyl]titanium (IRGACURE 784 DC, available from Ciba Specialty Chemicals); 2-benzyl-2-N,N-dimethyl amino-1-(4-morpholinophenyl)-1-butanone (IRGACURE 369, available from Ciba Specialty Chemicals) and the EB3, KB1, TZT, KIP 100F, ITX, EDB, X15 and KT37 series of ESACURE™ photoinitiators (commercially available from Sartomer Inc.). Preferably, about 1 to about 5 wt. % free radical UV curing photoinitiator is employed.

The outermost layer comprises a free radically polymerizable moiety. Preferably the free radically polymerizable moiety is UV curable. Suitable free radically polymerizable moieties include those mentioned above. Outermost coatings based on multifunctional acrylates and methacrylates are preferred. The types and amounts of ingredients in such outermost coatings will be familiar to those skilled in the art.

The multilayer finish layers typically serve different functions depending upon their nearness to the veneer surface or to the exposed outermost surface of the veneered article. For example, the disclosed multilayer finish system may include in order a clearcoat or stain that lies atop the veneer surface and assists in providing a desirable wood grain appearance in the coated veneered article, a filler that contacts at least some of the wood veneer fibers and levels the clearcoated or stained veneer surface by filling in pores, knife marks and other depressions, and a sealer, topcoat or both sealer and topcoat that provide a hard, durable, moisture resistant and weathering resistant (e.g., sunlight resistant) surface that protects the underlying filler, clearcoat or stain and veneer from damage or deterioration. Any or all of the underlying layers may contain a UV curable cationically polymerizable moiety. Where three or more layers are employed then preferably the layer or layers nearest the veneer surface comprises a UV curable cationically polymerizable moiety, the next layer comprises a UV curable cationically/free radically polymerizable moiety, and the outermost layer comprises a UV curable free radically polymerizable moiety.

The individual layers of the multilayer finish system may contain adjuvants such as pigments, dyes, fillers, extenders, surfactants, defoamers, waxes, solvents, adhesion promoters, optical brighteners, light stabilizers or antioxidants. The types and amounts of such adjuvants will be apparent to those skilled in the art. For example, a filler layer may contain one or more particulate or fibrous solids, e.g., inorganic materials such as aluminum oxide, calcium carbonate, carbon black, magnesium silicate hydroxide (talc), silica or titanium dioxide, and organic materials such as polypropylene or polyethylene. A stain layer may for example contain up to about 5 wt. % solids and a filler layer may for example contain up to about 60 wt. % solids.

The wood veneer surface may be cleaned and prepared for application of the multilayer finish system using methods (e.g., sanding) that will be familiar to those skilled in the art. Each layer preferably is applied in an amount sufficient to provide good wet coat coverage and a continuous cured coating. Recommended application rates are about 11 to about 16 $g/m^2$ for a clearcoat or stain, and about 20 to about 40 $g/m^2$ for a filler, sealer or topcoat. The layers should be exposed to sufficient curing conditions (e.g., sufficient UV energy in the case of a UV curable layer) to obtain thorough cure. Suitable curing conditions may be determined empirically based on the particular equipment and wood species employed, and the surrounding atmosphere, throughput rate and ambient or elevated temperature at the curing site. We have found that improved veneer check resistance may be obtained by using a pulsed UV curing technique rather than operating the UV cure equipment at a constant intensity. We have also found that improved veneer check resistance may be obtained by applying the stain and subsequent layers in the multilayer finishing system to not only the normally-exposed visible surface of the wood veneer but also to a normally-hidden surface (e.g., a side, backside or edge) of the veneer product. Doing so may also reduce splintering and make it easier to for factory workers and product installers to transport and manipulate the veneered wood product without injury. A sanding step and a de-nibbing step for appearance improvement may be employed after any or all layers of the disclosed multilayer finishing system have been applied and cured.

The multilayer finishing system can be applied to a variety of wood veneers, including hardwood species such as ash, birch, cherry, mahogany, maple, oak, poplar, teak, hickory and walnut, and softwood species such as cedar, fir, pine and redwood. The resulting finished veneered wood products can have a wide variety of uses including furniture, kitchen cabinetry, engineered flooring and veneered doors and trim. The finishing system components can be applied using a variety of methods that will be familiar to those skilled in the art, including spraying, brushing, roller coating and flood coating. Roller coating is a preferred application method.

The invention is further illustrated in the following non-limiting examples, in which all parts and percentages are by weight unless otherwise indicated.

EXAMPLE 1

Selected wood planks were cut in half across their centers to form two pieces. The paired pieces were labeled as control or treated planks. The control planks were finished using a conventional four-layer system employing VALSPAR™

KEB0506 free radical UV curable stain, VALSPAR KTF0018 free radical UV curable filler, VALSPAR KPS0047 free radical UV curable sealer and VALSPAR 1735C52099 free radical UV curable topcoat, all available from Valspar Corp. The treated planks were finished using the cationic UV curable stain shown below in Table 1 and the cationic/free radical UV curable filler shown below in Table 2, followed by the control plank free radical UV curable sealer and free radical UV curable topcoat. At least 10 pairs of control and treated planks were coated for comparison.

TABLE 1

Cationic UV Curable Stain

| Ingredient | Parts |
|---|---|
| 3,4-Epoxy cyclohexylmethyl-3,4-epoxy cyclohexyl carboxylate(1) | 79.1 |
| 3-Ethyl-3-hydroxymethyl oxetane(2) | 8.7 |
| Triarylsulfonium phosphate salt(3) | 7.2 |
| White epoxy paste(4) | 4.5 |
| Siloxane polyalkyleneoxide copolymer(5) | 0.5 |

(1)CYRACURE ™ UVR 6110 cycloaliphatic epoxide, available from Dow Chemical Co.
(2)CYRACURE UVR 6000 diluent, available from Dow Chemical Co.
(3)CYRACURE UVI 6992 photoinitiator, available from Dow Chemical Co.
(4)18W399 epoxy, available from Penn Color, Inc.
(5)SILWET ™ L-7604 surfactant, available from Crompton Corp.

TABLE 2

Cationic/Free Radical UV Curable Filler

| Ingredient | Parts |
|---|---|
| 3,4-Epoxy cyclohexylmethyl-3,4-epoxy cyclohexyl carboxylate(1) | 30.4 |
| Triarylsulfonium phosphate salt(2) | 5.0 |
| Benzophenone(3) | 0.6 |
| Solution of mono acyl phosphine and hydroxyketone(4) | 0.1 |
| Solution of a saturated polyester with acidic groups(5) | 0.3 |
| Hydrated amorphous silica(6) | 0.3 |
| Magnesium silicate hydrate(7) | 3.2 |
| Nepheline syenite(8) | 28.1 |
| 1,6-hexanediol diacrylate(9) | 0.5 |
| Trimethylolpropane triacrylate(10) | 1.9 |
| Polyethylene glycol diacrylate(11) | 1.4 |
| Tripropyleneglycol diacrylate(12) | 6.5 |
| Acrylic oligomer(13) | 19.5 |
| 2-Hydroxy-2-methyl-1-phenyl-propane-1-one(14) | 2.3 |

(1)CYRACURE ™ UVR 6110 cycloaliphatic epoxide, available from Dow Chemical Co.
(2)CYRACURE UVI 6992 photoinitiator, available from Dow Chemical Co.
(3)Available from Ciba Specialty Chemicals Inc.
(4)DAROCUR ™ 4265 photoinitiator, available from Ciba Specialty Chemicals Inc.
(5)DISPERBYK ™ 110, available from Byk-Chemie GmbH.
(6)HI-SIL ™ T-600 filler, available from PPG Industries.
(7)MP 315-38 filler, available from Barretts, Inc.
(8)MINEX ™ 7 filler, available from Unimin Canada Ltd.
(9)EBECRYL ™ HDDA, available from UCB Chemicals.
(10)EBECRYL TMPTA, available from UCB Chemicals.
(11)SR-344, available from Sartomer Company.
(12)SR-306, available from Sartomer Company.
(13)E20016, available from UCB Chemicals.
(14)DAROCUR 1173 photoinitiator, available from Ciba Specialty Chemicals Inc.

The thus-coated planks were placed in an oven at 63° C. for 16 or 32 hours to evaluate veneer check resistance. The paired planks were removed from the oven, examined side-by-side and rated according to the following scale:

TABLE 3

Veneer Check Rating Scale

| Rating | Criteria |
|---|---|
| Excellent | No or almost no check in the treated piece while the control piece checked badly |
| Much Better | Not as good as Excellent but ⅓ or less check in the treated piece than in the control piece |
| Better | Not as good as Much Better but less check in the treated piece than in the control piece |
| Equal, No Check | Little or no check in the treated piece and the control piece |
| Equal, Some Check | Similar, significant checking in both the treated piece and the control piece |
| Much More Check | More check in the treated piece than in the control piece |

The veneer check rating results are shown below in Table 4:

TABLE 4

Hot Oven Veneer Check Resistance

| | Rating, % of Treated Planks | | | | | |
|---|---|---|---|---|---|---|
| Testing Time, hours | Excellent | Much Better | Better | Equal, No Check | Equal, Some Check | Much More Check |
| 16 | 0 | 75 | 25 | 0 | 0 | 0 |
| 32 | 0 | 50 | 38 | 0 | 13 | 0 |

As shown in Table 4, the treated planks had at least equal and usually much better or better veneer check resistance than the control planks.

EXAMPLE 2

Using the method of Example 1, planks were finished using the cationic UV curable stain shown below in Table 5, followed by a layer of the cationic/free radical UV curable filler shown below in Table 6, followed by a layer of the cationic/free radical UV curable filler shown below in Table 7, followed by the Example 1 free radical UV curable sealer and the Example 1 free radical UV curable topcoat. The veneer check results are set out below in Table 8.

TABLE 5

Cationic UV Curable Stain

| Ingredient | Parts |
|---|---|
| 3,4-Epoxy cyclohexylmethyl-3,4-epoxy cyclohexyl carboxylate(1) | 77.1 |
| 3-Ethyl-3-hydroxymethyl oxetane(2) | 8.5 |
| Triarylsulfonium phosphate salt(3) | 6.9 |
| Yellow epoxy paste(4) | 4.3 |
| Red epoxy paste(5) | 2.2 |
| Carbon black epoxy paste(6) | 1.1 |

(1)CYRACURE UVR 6110 cycloaliphatic epoxide, available from Dow Chemical Co.
(2)CYRACURE UVR 6000 diluent, available from Dow Chemical Co.
(3)CYRACURE UVI 6992 photoinitiator, available from Dow Chemical Co.
(4)9Y185 epoxy, available from Penn Color, Inc.
(5)9R445 epoxy, available from Penn Color, Inc.
(6)9B1 epoxy, available from Penn Color, Inc.

TABLE 6

| Cationic/Free Radical UV Curable Filler | |
|---|---|
| Ingredient | Parts |
| 3,4-Epoxy cyclohexylmethyl-3,4-epoxy cyclohexyl carboxylate(1) | 33.5 |
| Triarylsulfonium phosphate salt(2) | 5.5 |
| Benzophenone(3) | 0.5 |
| Solution of mono acyl phosphine and hydroxyketone(4) | 0.1 |
| Solution of a saturated polyester with acidic groups(5) | 0.2 |
| Hydrated amorphous silica(6) | 0.2 |
| Magnesium silicate hydrate(7) | 3.3 |
| Nepheline syenite(8) | 27.9 |
| 1,6-hexanediol diacrylate(9) | 0.4 |
| Trimethylolpropane triacrylate(10) | 1.7 |
| Polyethylene glycol diacrylate(11) | 1.2 |
| Tripropyleneglycol diacrylate(12) | 5.8 |
| Acrylic oligomer(13) | 17.5 |
| 2-Hydroxy-2-methyl-1-phenyl-propane-1-one(14) | 2.1 |

(1)CYRACURE UVR 6110 cycloaliphatic epoxide, available from Dow Chemical Co.
(2)CYRACURE UVI 6992 photoinitiator, available from Dow Chemical Co.
(3)Available from Ciba Specialty Chemicals Inc.
(4)DAROCUR 4265 photoinitiator, available from Ciba Specialty Chemicals Inc.
(5)DISPERBYK 110, available from Byk-Chemie GmbH.
(6)HI-SIL T-600 filler, available from PPG Industries.
(7)MP 315-38 filler, available from Barretts, Inc.
(8)MINEX 7 filler, available from Unimin Canada Ltd.
(9)EBECRYL ™ HDDA, available from UCB Chemicals.
(10)EBECRYL TMPTA, available from UCB Chemicals.
(11)SR-344, available from Sartomer Company.
(12)SR-306, available from Sartomer Company.
(13)E20016, available from UCB Chemicals.
(14)DAROCUR 1173 photoinitiator, available from Ciba Specialty Chemicals Inc.

TABLE 7

| Cationic/Free Radical UV Curable Filler | |
|---|---|
| Ingredient | Parts |
| 3,4-Epoxy cyclohexylmethyl-3,4-epoxy cyclohexyl carboxylate(1) | 27.6 |
| Triarylsulfonium phosphate salt(2) | 4.5 |
| Benzophenone(3) | 0.6 |
| Solution of mono acyl phosphine and hydroxyketone(4) | 0.1 |
| Solution of a saturated polyester with acidic groups(5) | 0.3 |
| Hydrated amorphous silica(6) | 0.3 |
| Magnesium silicate hydrate(7) | 3.4 |
| Nepheline syenite(8) | 28.6 |
| 1,6-hexanediol diacrylate(9) | 0.5 |
| Trimethylolpropane triacrylate(10) | 2.0 |
| Polyethylene glycol diacrylate(11) | 1.5 |
| Tripropyleneglycol diacrylate(12) | 7.0 |
| Acrylic oligomer(13) | 21.1 |
| 2-Hydroxy-2-methyl-1-phenyl-propane-1-one(14) | 2.5 |

(1)CYRACURE UVR 6110 cycloaliphatic epoxide, available from Dow Chemical Co.
(2)CYRACURE UVI 6992 photoinitiator, available from Dow Chemical Co.
(3)Available from Ciba Specialty Chemicals Inc.
(4)DAROCUR 4265 photoinitiator, available from Ciba Specialty Chemicals Inc.
(5)DISPERBYK 110, available from Byk-Chemie GmbH.
(6)HI-SIL T-600 filler, available from PPG Industries.
(7)MP 315-38 filler, available from Barretts, Inc.
(8)MINEX 7 filler, available from Unimin Canada Ltd.
(9)EBECRYL HDDA, available from UCB Chemicals.
(10)EBECRYL TMPTA, available from UCB Chemicals.
(11)SR-344, available from Sartomer Company.
(12)SR-306, available from Sartomer Company.
(13)E20016, available from UCB Chemicals.
(14)DAROCUR 1173 photoinitiator, available from Ciba Specialty Chemicals Inc.

TABLE 8

Hot Oven Veneer Check Resistance

| Testing Time, hours | Rating, % of Treated Planks: Excellent | Much Better | Better | Equal, No Check | Equal, Some Check | Much More Check |
|---|---|---|---|---|---|---|
| 16 | 11 | 56 | 22 | 11 | 0 | 0 |

As shown in Table 8, the treated planks had at least equal and usually better, much better or excellent veneer check resistance compared to the control planks.

EXAMPLE 3

Using the method of Example 1, planks were finished using the cationic UV curable clearcoat shown below in Table 9, followed by the control plank free radical UV curable filler, control plank free radical UV curable sealer and control plank free radical UV curable topcoat. UV curing was performed using both continuous and pulsed UV. The veneer check results for the two curing techniques are set out below in Table 10.

TABLE 9

| Cationic UY Curable Clearcoat | |
|---|---|
| Ingredient | Parts |
| 3,4-epoxy cyclohexylmethyl-3,4-epoxy cyclohexyl carboxylate(1) | 95 |
| Triarylsulfonium phosphate salt(2) | 5 |

(1)CYRACURE UVR 6110 cycloaliphatic epoxide, available from Dow Chemical Co.
(2)CYRACURE UVI 6992 photoinitiator, available from Dow Chemical Co.

TABLE 10

Hot Oven Veneer Check Resistance

| UV Cure Method | Rating, % of Treated Planks: Excellent | Much Better | Better | Equal, No Check | Equal, Some Check | Much More Check |
|---|---|---|---|---|---|---|
| Pulsed UV | 0 | 60 | 0 | 40 | 0 | 0 |
| Continuous UV | 0 | 0 | 0 | 20 | 60 | 20 |

As shown in Table 10, the treated planks had at least equal and usually much better veneer check resistance than the control planks. Much better check resistance was observed when curing using pulsed UV.

EXAMPLE 4

Using the method of Example 1, planks were finished using the cationic/free radical UV curable stain shown below in Table 11, followed by the cationic/free radical UV curable filler shown below in Table 12, followed by the control plank free radical UV curable sealer and control plank free radical UV curable topcoat. The veneer check results are set out below in Table 13.

TABLE 11

| Cationic/Free Radical UV Curable Stain | |
|---|---|
| Ingredient | Parts |
| 3,4-Epoxy cyclohexylmethyl-3,4-epoxy cyclohexyl carboxylate(1) | 59.0 |
| 3-Ethyl-3-hydroxymethyl-oxetane(2) | 3.2 |
| Triarylsulfonium phosphate salt(3) | 4.6 |
| Benzophenone(4) | 1.4 |
| Solution of mono acyl phosphine and hydroxyketone(5) | 0.2 |
| Solution of a saturated polyester with acidic groups(6) | 0.7 |
| Hydrated amorphous silica(7) | 0.7 |
| 1,6-hexanediol diacrylate(8) | 1.1 |
| Trimethylolpropane triacrylate(9) | 4.5 |
| Polyethylene glycol diacrylate(10) | 3.4 |
| Tripropyleneglycol diacrylate(11) | 15.8 |
| 2-Hydroxy-2-methyl-1-phenyl-propane-1-one(12) | 5.6 |

(1)CYRACURE UVR 6110 cycloaliphatic epoxide, available from Dow Chemical Co.
(2)CYRACURE UVR 6000 epoxide, available from Dow Chemical Co.
(3)CYRACURE UVI 6992 photoinitiator, available from Dow Chemical Co.
(4)Available from Ciba Specialty Chemicals Inc.
(5)DAROCUR 4265 photoinitiator, available from Ciba Specialty Chemicals Inc.
(6)DISPERBYK 110, available from Byk-Chemie GmbH.
(7)HI-SIL T-600 filler, available from PPG Industries.
(8)EBECRYL ™ HDDA, available from UCB Chemicals.
(9)EBECRYL TMPTA, available from UCB Chemicals.
(10)SR-344, available from Sartomer Company.
(11)SR-306, available from Sartomer Company.
(12)DAROCUR 1173 photoinitiator, available from Ciba Specialty Chemicals Inc.

TABLE 12

| Cationic/Free Radical UV Curable Filler | |
|---|---|
| Ingredient | Parts |
| 3,4-Epoxy cyclohexylmethyl-3,4-epoxy cyclohexyl carboxylate(1) | 26.5 |
| Triarylsulfonium phosphate salt(2) | 1.4 |
| Benzophenone(3) | 0.3 |
| Solution of mono acyl phosphine and hydroxyketone(4) | 0.1 |
| Solution of a saturated polyester with acidic groups(5) | 0.1 |
| Hydrated amorphous silica(6) | 0.1 |
| Nepheline syenite(7) | 54.6 |
| 1,6-hexanediol diacrylate(8) | 0.2 |
| Trimethylolpropane triacrylate(9) | 1.0 |
| Polyethylene glycol diacrylate(10) | 0.7 |
| Tripropyleneglycol diacrylate(11) | 3.4 |
| Acrylic oligomer(12) | 10.3 |
| 2-Hydroxy-2-methyl-1-phenyl-propane-1-one(13) | 1.2 |

(1)CYRACURE UVR 6110 cycloaliphatic epoxide, available from Dow Chemical Co.
(2)CYRACURE UVI 6992 photoinitiator, available from Dow Chemical Co.
(3)Available from Ciba Specialty Chemicals Inc.
(4)DAROCUR 4265 photoinitiator, available from Ciba Specialty Chemicals Inc.
(5)DISPERBYK 110, available from Byk-Chemie GmbH.
(6)HI-SIL T-600 filler, available from PPG Industries.
(7)MINEX 7 filler, available from Unimin Canada Ltd.
(8)EBECRYL ™ HDDA, available from UCB Chemicals.
(9)EBECRYL TMPTA, available from UCB Chemicals.
(10)SR-344, available from Sartomer Company.
(11)SR-306, available from Sartomer Company.
(12)E20016, available from UCB Chemicals.
(13)DAROCUR 1173 photoinitiator, available from Ciba Specialty Chemicals Inc.

TABLE 13

| Hot Oven Veneer Check Resistance Rating, % of Treated Planks | | | | | |
|---|---|---|---|---|---|
| Excellent | Much Better | Better | Equal, No Check | Equal, Some Check | Much More Check |
| 0 | 100 | 0 | 0 | 0 | 0 |

As shown in Table 13, the treated planks had much better veneer check resistance than the control planks.

EXAMPLE 5

Using the method of Example 1, planks were finished using VALSPAR 1735C50299 free radical UV curable stain, followed by the cationic/free radical UV curable filler shown in Table 12, followed by the control plank free radical UV curable sealer and control plank free radical UV curable topcoat. The veneer check results are set out below in Table 14.

TABLE 14

| Hot Oven Veneer Check Resistance Rating, % of Treated Planks | | | | | |
|---|---|---|---|---|---|
| Excellent | Much Better | Better | Equal, No Check | Equal, Some Check | Much More Check |
| 0 | 80 | 20 | 0 | 0 | 0 |

As shown in Table 14, the treated planks had much better or better veneer check resistance than the control planks.

EXAMPLE 6

Using the method of Example 1, planks were finished using the cationic UV curable stain shown in Table 1, followed by the cationic UV curable filler shown below in Table 15, followed by the control plank free radical UV curable sealer and control plank free radical UV curable topcoat. The veneer check results are set out below in Table 16.

TABLE 15

| Cationic UV Curable Filler | |
|---|---|
| Ingredient | Parts |
| 3,4-Epoxy cyclohexylmethyl-3,4-epoxy cyclohexyl carboxylate(1) | 57.8 |
| Triarylsulfonium phosphate salt(2) | 7.0 |
| Solution of a saturated polyester with acidic groups(3) | 1.9 |
| Hydrated amorphous silica(4) | 1.9 |
| Magnesium silicate hydrate(5) | 3.3 |
| Nepheline syenite(6) | 28.0 |

(1)CYRACURE UVR 6110 cycloaliphatic epoxide, available from Dow Chemical Co.
(2)CYRACURE UVI 6992 photoinitiator, available from Dow Chemical Co.
(3)DISPERBYK 110, available from Byk-Chemie GmbH.
(4)HI-SIL T-600 filler, available from PPG Industries.
(5)MP 315-38 filler, available from Barretts, Inc.
(6)MINEX 7 filler, available from Unimin Canada Ltd.

TABLE 16

| Hot Oven Veneer Check Resistance Rating, % of Treated Planks | | | | | |
|---|---|---|---|---|---|
| Excellent | Much Better | Better | Equal, No Check | Equal, Some Check | Much More Check |
| 40 | 20 | 0 | 40 | 0 | 0 |

As shown in Table 16, the treated planks had excellent or much better veneer check resistance than the control planks.

EXAMPLE 7

Using the method of Example 1, planks were finished using the cationic UV curable stain shown in Table 1, followed by the cationic UV curable filler shown in Table 15, followed by the cationic/free radical UV curable sealer shown below in Table 17, followed by the control plank free radical UV curable topcoat. The veneer check results are set out below in Table 18.

TABLE 17

Cationic/Free Radical UV Curable Sealer

| Ingredient | Parts |
|---|---|
| 3,4-Epoxy cyclohexylmethyl-3,4-epoxy cyclohexyl carboxylate(1) | 29.5 |
| Triarylsulfonium phosphate salt(2) | 1.6 |
| Benzophenone(3) | 0.8 |
| Solution of mono acyl phosphine and hydroxyketone(4) | 0.1 |
| Solution of a saturated polyester with acidic groups(5) | 0.4 |
| Hydrated amorphous silica(6) | 0.4 |
| Magnesium silicate hydrate(7) | 7.9 |
| Nepheline syenite(8) | 13.8 |
| 1,6-hexanediol diacrylate(9) | 0.7 |
| Trimethylolpropane triacrylate(10) | 2.6 |
| Polyethylene glycol diacrylate(11) | 2.0 |
| Tripropyleneglycol diacrylate(12) | 9.2 |
| Acrylic oligomer(13) | 27.7 |
| 2-Hydroxy-2-methyl-1-phenyl-propane-1-one(14) | 3.3 |

(1)CYRACURE UVR 6110 cycloaliphatic epoxide, available from Dow Chemical Co.
(2)CYRACURE UVI 6992 photoinitiator, available from Dow Chemical Co.
(3)Available from Ciba Specialty Chemicals Inc.
(4)DAROCUR 4265 photoinitiator, available from Ciba Specialty Chemicals Inc.
(5)DISPERBYK 110, available from Byk-Chemie GmbH.
(6)HI-SIL T-600 filler, available from PPG Industries.
(7)MP 315-38 filler, available from Barretts, Inc.
(8)MINEX 7 filler, available from Unimin Canada Ltd.
(9)EBECRYL ™ HDDA, available from UCB Chemicals.
(10)EBECRYL TMPTA, available from UCB Chemicals.
(11)SR-344, available from Sartomer Company.
(12)SR-306, available from Sartomer Company.
(13)E20016, available from UCB Chemicals.
(14)DAROCUR 1173 photoinitiator, available from Ciba Specialty Chemicals Inc.

TABLE 18

| Hot Oven Veneer Check Resistance Rating, % of Treated Planks | | | | | |
|---|---|---|---|---|---|
| Excellent | Much Better | Better | Equal, No Check | Equal, Some Check | Much More Check |
| 40 | 20 | 0 | 40 | 0 | 0 |

As shown in Table 18, the treated planks had equal, much better or excellent veneer check resistance compared to the control planks.

EXAMPLE 8

Using the method of Example 1, planks were finished using the Example 5 free radical UV curable stain, followed by the Example 5 cationic/free radical UV curable filler, followed by VALSPAR KSS0045 free radical UV curable sealer. These planks were compared to control planks finished using the Example 5 free radical UV curable stain, followed by the Example 1 control plank free radical UV curable filler, followed by VALSPAR KSS0045 free radical UV curable sealer. The filler layers were subjected to two different curing levels to simulate a desired UV dose and an undesirable (but possible under factory conditions) three-fold UV overdose. The finished planks were subjected to a crosshatch tape pull test to evaluate intercoat adhesion. The tape pull test results are set out below in Table 19.

TABLE 19

| Crosshatch Inter-coat Adhesion | | |
|---|---|---|
| Filler Layer Curing Energy, mJ/cm$^2$ | Control (Free Radical UV Curable Filler) | Dual Cure Cationic/Free Radical UV Curable Filler |
| 320 | Excellent | Excellent |
| 1280 | Failed | Excellent |

Failure was observed for the overdosed control planks at the sealer/filler interface, but was not observed for overdosed planks employing a cationic/free radical UV curable filler.

Various modifications and alterations of this invention will be apparent to those skilled in the art without departing from the scope and spirit of this invention. It should be understood that this invention is not limited to the illustrative embodiments set forth above.

We claim:

1. A method for finishing a veneer surface of a veneered wood product comprising applying to the veneer surface and UV curing a plurality of coating layers, which method comprises the steps of:

(a) applying and cationically polymerizing at least one subsurface layer comprising a UV curable cationically polymerizable moiety and (b) applying and free radically polymerizing an outermost layer comprising a free radically polymerizable moiety, wherein a coating layer nearest the veneer surface comprises a cationically polymerized moiety or moiety polymerized via cationic and free radical cure mechanisms, and wherein the finished veneer surface exhibits less veneer checking than a veneer finished only with free radically polymerized coating layers.

2. A method according to claim 1 comprising applying to the veneer surface and cationically polymerizing a UV curable clearcoat or stain.

3. A method according to claim 1 comprising applying and cationically polymerizing a UV curable filler.

4. A method according to claim 1 comprising applying and cationically polymerizing a UV curable sealer.

5. A method according to claim 1 comprising applying and free radically polymerizing a UV curable topcoat.

6. A method according to claim 1 comprising applying and cationically polymerizing a plurality of coating layers at least two subsurface layers of which comprise UV curable cationically polymerizable moieties.

7. A method according to claim 1 comprising applying and cationically polymerizing at least one cationically polymerizable subsurface layer atop the veneer surface, followed by cationically and free radically polymerizing at least one subsurface layer, followed by free radically polymerizing an outermost layer.

8. A method according to claim 1 wherein a subsurface coating layer comprises an epoxide.

9. A method according to claim 1 wherein a subsurface coating layer comprises an epoxycyclohexanecarboxylate.

10. A method according to claim 1 wherein a subsurface coating layer comprises a cationically and free radically polymerized UV curable composition.

11. A method according to claim 1 wherein a subsurface coating layer comprises an acrylated epoxide.

12. A method according to claim 1 wherein a subsurface coating layer comprises a UV curable cationically polymerizable moiety polymerized using an arylsulfonium salt photoinitiator.

13. A method according to claim 1 comprising curing at least one coating layer using pulsed UV.

14. A method according to claim 1 wherein the veneered wood product comprises a medium density fiberboard core.

15. A method according to claim 1 wherein the veneer comprises ash, birch, cherry, mahogany, maple, oak, poplar, teak, hickory or walnut.

16. A method according to claim 1 comprising applying to at least one visible veneer surface and to a backside of the wood product and cationically polymerizing at least one layer comprising a UV curable cationically polymerizable moiety.

17. A method for finishing a veneer surface of a veneered wood product comprising applying to the veneer surface and UV curing a plurality of coating layers, which method comprises the steps of:

(a) applying and cationically polymerizing at least one subsurface layer comprising a UV curable cationically and free radically polymerizable moiety and (b) applying and free radically polymerizing an outermost layer comprising a free radically polymerizable moiety, wherein a layer comprising the UV curable cationically and free-radically polymerizable moiety is applied nearest the veneer layer, and wherein the finished veneer surface exhibits less veneer checking than a veneer finished only with free radically polymerized coating layers.

18. A method according to claim 17 wherein the layers maintain intercoat adhesion even if a UV overdose is employed to apply a subsurface layer.

19. A method for finishing a surface of a veneered wood product comprising:

a) applying to the veneer surface and cationically polymerizing a UV curable clearcoat or stain, b) applying to the thus-clearcoated or stained surface and UV-curing a cationically and free radically polymerizable filler, and c) optionally applying to the thus-filled surface and UV curing a sealer, topcoat, or both topcoat and sealer, wherein the finished veneer surface exhibits less veneer checking than a veneer finished only with free radically polymerized coating layers.

20. A method according to claim 18 comprising applying and free radically polymerizing a UV curable sealer, topcoat, or both topcoat and sealer.

* * * * *